(12) United States Patent
Bourgeois et al.

(10) Patent No.: US 10,704,737 B2
(45) Date of Patent: Jul. 7, 2020

(54) METHOD AND DEVICE FOR FILLING OR WITHDRAWING FROM A PRESSURIZED GAS TANK

(71) Applicant: L'Air Liquide, Societe Anonyme pour l'Etude et l'Exploitation des Procedes Georges Claude, Paris (FR)

(72) Inventors: Thomas Bourgeois, Paris (FR); Fouad Ammouri, Massy (FR); Mathilde Weber, Gentilly (FR); Elena Vyazmina, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 311 days.

(21) Appl. No.: 15/573,246

(22) PCT Filed: May 4, 2016

(86) PCT No.: PCT/FR2016/051063
§ 371 (c)(1),
(2) Date: Nov. 10, 2017

(87) PCT Pub. No.: WO2016/181057
PCT Pub. Date: Nov. 17, 2016

(65) Prior Publication Data
US 2018/0112828 A1 Apr. 26, 2018

(30) Foreign Application Priority Data
May 12, 2015 (FR) ...................................... 15 54207

(51) Int. Cl.
*F17C 13/02* (2006.01)
*F17C 5/06* (2006.01)

(52) U.S. Cl.
CPC .............. *F17C 13/026* (2013.01); *F17C 5/06* (2013.01); *F17C 13/023* (2013.01);
(Continued)

(58) Field of Classification Search
CPC ........ F17C 2250/0694; F17C 2260/026; F17C 2260/023; F17C 2221/012; F17C 13/026
See application file for complete search history.

(56) References Cited

U.S. PATENT DOCUMENTS 9,574,708 B2 * 2/2017 Ammouri ............. F17C 13/025
2014/0290790 A1 10/2014 Mathison

FOREIGN PATENT DOCUMENTS

| EP | 2 824 378 | 1/2015 |
| FR | 2 884 592 | 10/2006 |
| WO | WO 2013/014346 | 1/2013 |

OTHER PUBLICATIONS

Bourgeois et al., "Evaluating the temperature inside a tank during a filling with highly-pressurized gas", Proceedings of the 20th World Hydrogen Energy Conference, Seoul, Korea, 2014.
(Continued)

*Primary Examiner* — Timothy P. Kelly
(74) *Attorney, Agent, or Firm* — Christopher J. Cronin

(57) ABSTRACT

A method for filling or withdrawing from a pressurized gas tank. The tank having a wall having a cylindrical overall shape with dimensions and thermophysical properties that are given and known. The method including the regulation of the flow rate of the introduced or withdrawn gas, and/or of the temperature of the introduced gas, to avoid a situation in which the tank reaches a given high temperature threshold or a given low temperature threshold. The method including a step of estimating, by calculating in real time, at least one tank temperature from: the average temperature of the tank wall, the maximum temperature reached by the tank wall, the minimum temperature reached by the tank wall, and in
(Continued)

that the flowrate of gas or the temperature of the gas is regulated depending on the calculated tank temperature.

14 Claims, 3 Drawing Sheets

(52) U.S. Cl.
CPC ............... *F17C 2201/0104* (2013.01); *F17C 2201/0109* (2013.01); *F17C 2201/056* (2013.01); *F17C 2201/058* (2013.01); *F17C 2203/0604* (2013.01); *F17C 2203/066* (2013.01); *F17C 2203/0619* (2013.01); *F17C 2203/0636* (2013.01); *F17C 2203/0663* (2013.01); *F17C 2205/0352* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0302* (2013.01); *F17C 2227/0388* (2013.01); *F17C 2227/04* (2013.01); *F17C 2250/032* (2013.01); *F17C 2250/043* (2013.01); *F17C 2250/0421* (2013.01); *F17C 2250/0439* (2013.01); *F17C 2250/0443* (2013.01); *F17C 2250/0491* (2013.01); *F17C 2250/0495* (2013.01); *F17C 2250/0615* (2013.01); *F17C 2250/0631* (2013.01); *F17C 2250/0636* (2013.01); *F17C 2250/0694* (2013.01); *F17C 2260/023* (2013.01); *F17C 2260/026* (2013.01); *F17C 2265/065* (2013.01); *F17C 2270/0178* (2013.01); *Y02E 60/321* (2013.01)

(56) References Cited

OTHER PUBLICATIONS

International Search Report and Written Opinion for PCT/FR216/051063, dated Jul. 25, 2016.
French Search Report and Written Opinion for FR 1 554 207, dated Mar. 31, 2016.

* cited by examiner

METHOD AND DEVICE FOR FILLING OR WITHDRAWING FROM A PRESSURIZED GAS TANK

CROSS-REFERENCE TO RELATED APPLICATIONS

This application is a § 371 of International PCT Application PCT/FR2016/051063, filed May 4, 2016, which claims § 119(a) foreign priority to French patent application FR1554207, filed May 12, 2015.

BACKGROUND

Field of the Invention

The present invention relates to a method for filling or bleeding off a pressurized gas tank.

Related Art

The invention relates more to a method for filling or bleeding off a pressurized gas tank, in particular for fuel such as gaseous hydrogen, the tank being delimited by a wall of cylindrical general shape having determined and known dimensions and thermo-physical properties, the method comprising a regulation of the flowrate of the gas flow introduced or, respectively of the gas bled off, and/or of the temperature of said gas introduced, so as to prevent the tank from reaching a determined high temperature threshold or a determined low temperature threshold.

The invention relates in particular to the filling or the bleeding off of pressurized hydrogen tanks in particular of composite tanks storing gas at high pressures, in particular 200 bar, 700 bar or 1000 bar.

These composite tanks (in particular of type IV) have a more limited resistance to extreme temperatures than metal tanks. For example, the limit temperatures of use of such tanks must be between −40° C. and +85° C.

Thus, the filling processes (producing heating) and the bleed-off process (producing cooling) must be controlled.

This control can be carried out in particular by controlling the flowrate of gas and/or its temperature.

A standard (SAE) for filling automotive vehicles has been developed to establish cooling recommendations and filling rates as a function of initial conditions (ambient temperature, initial pressure in the tank, etc.). This model is based on the temperature of the gas in the tank and not the temperature of the tank (which is generally less than that of the gas).

The measurement of the maximum temperature reached by the tank is, however, difficult to measure.

Under these conditions, the filling condition recommendations established by this standard are considered to be too constraining and therefore in part needless and to generate significant cost overheads.

SUMMARY OF THE INVENTION

An aim of the present invention is to alleviate all or some of the above-noted drawbacks of the prior art.

To this end, the method according to the invention, moreover in accordance with the generic definition thereof given by the preamble hereinabove, is essentially characterized in that it comprises a step of real-time estimation by calculation of at least one temperature of the tank from among: the average temperature of the wall of the tank Twall,average(r,t) as a function of time (t), the maximum temperature reached by the wall of the tank Twall,max(t) as a function of time, the minimum temperature reached by the wall of the tank Twall,min(t) as a function of time and in that, the regulation of the flowrate of the gas flow or of the temperature of said gas is carried out as a function of said calculated temperature of the tank.

According to the invention it is thus possible to estimate, via a mathematical model based on measurements of pressure in the tank and of the ambient temperature, the maximum or minimum temperature reached by the wall of the tank.

The values of gas pressure and of ambient temperature are external measured data. That is to say that there is no need for complex measurements in the filled or bled-off tank.

A three-dimensional dynamic mathematical model can be used to calculate the temperature in the tank, including at the level of its wall. However, preferably the invention uses a simplified model.

This simplified model can be based in particular on the input data, namely: the temperature of the gas in the transfer line to the tank, its pressure, the geometric characteristics of the tank, the ambient temperature.

Other thermo-physical parameters of the tank can be used such as for example the thermal conductivity, the heat capacity and the density.

As illustrated in FIG. 3, the initial mass m(0) of gas in the tank 1 can also a known or estimated input datum. Likewise for the flowrate Q(t) of gas transferred at the time t.

Preferably, the model calculates on this basis and in real time the average temperature of the gas in the tank and its fill state ("SOC=percentage fill in which 100% corresponds to the mass quantity of gas of the tank filled at its service pressure and a determined homogeneous temperature, in particular 15° C.). This state of charge SOC is directly related to the average temperature of the gas in the tank and to its pressure via an equation of state of the gas.

Preferably, the model calculates on this basis in real time also the average temperature of the wall of the tank according to two dimensions Tw,average(r,t) in which r is the spatial coordinate (in particular the radius r with respect to the longitudinal central axis of the cylindrical tank) and t the time.

Preferably, the model calculates on this basis in real time also the maximum temperature of the wall of the tank Tw,max(t) in which t is the time. The model can also calculate the minimum temperature of the wall of the tank Tw,min(t) as a function of time t.

These data can be obtained if appropriate on the basis of the (calculated) temperature Tgas,average(t) of the gas.

This mathematical and thermodynamic model can be integrated into a programmable logic controller ("PLC") making it possible to estimate in real time the extreme temperature during filling or bleed-off. The average temperature of the gas in the tank can also be calculated.

On the basis of this datum of the extreme temperature of the wall, the controller can adjust the gas transfer rate (filling or bleed-off) and/or the level of cooling of the gas (filling) so as to remain within safety temperatures.

This solution makes it possible to avoid flowrate regulations or coolings that are overdimensioned with respect to the actual requirement.

According to other possible features:
 during filling, when the calculated temperature of the tank reaches a determined high threshold (HT), the flow and in particular the flowrate of gas is decreased and/or the temperature of the gas supplied to the tank is decreased by thermal exchange with a source of cold, during filling, when the calculated temperature of the tank is less than the high threshold by a determined value, the gas flow and in particular its flowrate is increased and/or the temperature of said gas and/or of the tank is increased by thermal exchange with a source of heat, the method comprises a step of calculating the Richardson Number (Ri) for the gas in the tank as a function of time, a step of comparing the Richardson Number number calculated with a determined reference value (Vr) lying between 0.05 and 1.5 and preferably between 0.05 and 0.15 and, when Richardson Number number calculated is less than determined reference value the temperature of the gas in the tank is considered to be homogeneous that is to say that the maximum temperature reached by the wall of the tank Twall,max(t) as a function of time is equal to the average temperature of the wall of the tank Twall,average(r,t) in contact with the gas as a function of time (t): Twall,max(t)=Twall,average(r=r_liner,t).

when the Richardson Number number calculated is greater than determined reference value, the temperature of the gas in the tank is considered to be heterogeneous that is to say that the maximum temperature reached by the wall of the tank Twall,max(t) as a function of time is not equal to the average temperature of the wall of the tank in contact with the gas as a function of time (t) that is to say at the level of what constitutes the "liner" of the tank, Twall,average (r=radius of the liner of the tank, t), and under these conditions, the method comprises a step of increasing the flowrate of gas supplied to the tank so as to decrease the value of the Richardson Number calculated below the determined reference value (Vr) and thus render the gas homogeneous in temperature, during filling, when the Richardson Number is greater than the reference value, the gas flow and in particular its flowrate is increased, the method comprises, before filling or, respectively, before bleed-off, a step of determining or detecting, by sensor(s), the initial temperature T(0) of the gas in the tank, the initial pressure P(0) of the gas in the tank, the initial average temperature of the wall of the tank $T_{w,\ average}(0)$ and a step of determining the initial mass of gas in the tank m(0) and then, during filling when the Richardson Number number calculated is less than determined reference value the temperature of the gas in the tank is considered to be homogeneous, that is to say that the maximum temperature reached by the wall of the tank Twall,max(t) as a function of time is equal to the average temperature of the wall of the tank Twall,average(r=r=radius of the liner of the tank,t) in contact with the gas as a function of time (t), and under these conditions, the method comprises, in the course of filling, a step of calculating the average temperature Tgas,average(t) of the gas in the tank in real time as a function of time and of the average temperature of the wall Twall,average(r,t) in real time as a function of time (t) on the basis of a mass and enthalpy balance applied to the gas in the tank and on the basis also of an energy balance in the wall of the tank, of the equation of state of the gas (in particular real gas equation), and of a balance of the thermal exchanges between the gas and the wall, and between the wall of the tank is the exterior, the method comprises, before filling or, respectively, before bleed-off, a step of determining or detecting, by sensor(s), the initial temperature T(0) of the gas in the tank, the initial pressure P(0) of the gas in the tank, the initial average temperature of the wall of the tank $T_{w,\ average}(0)$ and a step of determining the initial mass of gas in the tank m(0) and then, during filling when the Richardson Number number calculated is greater than determined reference value the temperature of the gas in the tank is considered to be heterogeneous that is to say that the maximum temperature reached by the wall of the tank Twall,max(t) as a function of time is not equal to the average temperature of the wall of the tank Twall,average(r)=r_liner,t) in contact with the gas as a function of time (t), and under these conditions, the method comprises, in the course of filling, a step of calculating the average temperature Tgas,average(t) of the gas in the tank in real time as a function of time (t) and the average temperature of the wall Twall,average (r,t) in real time as a function of time on the basis of a mass and enthalpy balance applied to the gas in the tank and of an energy balance in the wall of the tank, of the equation of state of the gas (ideal or real gas equation), and of a balance of the thermal exchanges between the wall of the tank is the exterior and in that the method comprises a step of calculating the maximum temperature reached by the wall of the tank Twall,max(t) as a function of time, this maximum temperature reached by the wall of the tank Twall,max(t) as a function of time being obtained by correlation on the basis of the average temperature Tgas,average(t) of the gas in the tank calculated in real time as a function of time and as a function of the average temperature of the wall Twall,average(r,t) in real time as a function of time (t), the method comprises a step of calculating the enthalpy hin(t) of the gas entering or exiting the tank as a function of time, a step of measuring or calculating the mass of gas m(t) introduced or bled off from the tank as a function of time or, respectively, a step of determining the pressure P(t) in the tank as a function of time, the method comprising a step of determining the average temperature of the gas Tgas,average(t) at the instant t in the tank in degrees K, this average temperature Tgas,average(t) being expressed as a first-degree function of the average temperature of the gas T(t−1) at the previous instant (t−1) and of a coefficient of convective heat exchange between the gas and the internal wall of the tank (1) at the instant (t−1) in $W \cdot m^{-2} \cdot K^{-1}$, in which the heat exchange coefficient $k_g(t-1)$ is given by the relation $k_g=(\lambda g/Dint) \cdot Nuint$ in which λg is the thermal conductivity of the gas in the tank in $W \cdot m^{-1} \cdot K^{-1}$, Dint is the internal diameter of the tank (1) in meters and NuDint the Nusselt number of the gas in the tank (1) (dimensionless), and in which the Nusselt number of the gas is expressed as a function of the Reynolds number (Redin) (dimensionless) relating to the forced convection in the tank and of the Rayleigh number (RaDint) (dimensionless) relating to the internal natural convection in the tank according to a formula $NuDint = a \cdot RaDint^b + c \cdot Redin^d$ in which a and c are dimensionless coefficients dependent on the ratio (Lint/Dint) between the internal length of the tank Lint in meters and the internal diameter of the tank Dint in meters and on the ratio (Dint/di) between the internal diameter of the tank Dint in meters and the diameter of the injector di in meters, a, b, c and d being dimensionless positive real numbers, a lying between 0 and 1, b lying between 0.2 and 0.5, c lying between 0 and 1 and d lying between 0.5 and 0.9, the method comprises a step of estimating the maximum temperature reached in the thickness of the tank Twall,max(t) as a function of time, or respectively the minimum temperature reached in the thickness of the tank Twall,min(t) as a function of time, on the basis of the average temperature Tgas,average(t) of the gas in the tank calculated in real time as a function of time (t), said maximum or minimum temperature being obtained on the basis of correspondence chart(s) obtained by experiments, and/or on the basis of calculation and/or of simulations so that to an average temperature Tgas,average(t) of the gas in the tank calculated in real time as a function of time (t) there corresponds, according to the known conditions of gas flowrate, of the diameter of injector of gas into the tank and of the dimensions and characteristics of the tank, a maximum or, respectively minimum, temperature in the thickness of the tank as a function of time, the Richardson Number (Ri) for the gas in the tank as a function of time is calculated on the basis of the Grashoff number (Gr) for the gas and of the Reynolds number (Re) for the gas at the time (t) according to the following formula: $Ri=Gr/Re^2$, in which the Grashof (Gr) and Reynolds (Re) numbers are data which are known or calculated on the basis of the measured value of pressure of the gas or of the mass of gas in the tank and of the average gas temperature Tgas,average(t) of the gas in the tank, during bleed-off, when the calculated temperature of the tank reaches a determined low threshold, the gas flow is decreased, the method comprises a step of continuous measurement or calculation of one at least from among: the pressure Pin(t) at the time (t) of the gas introduced into or bled off from the tank, the temperature Tin(t) at the time (t) of the gas introduced into or bled off from the tank, the pressure P(t) in the tank at the time (t), the ambient temperature (Tamb(t) at the time (t), the mass of gas m(t) in the tank at the time (t), the method is implemented by a station for filling hydrogen gas tanks comprising at least one high-pressure hydrogen source, at least one transfer pipe for selectively linking the source to a tank, and an electronic facility for data acquisition, storage and processing such as a computer or microprocessor, said facility piloting the transfer of gas between the source and the tank, the electronic logic (4) being programmed to calculate in real time at least one temperature of the tank from among: the average temperature of the wall of the tank Twall,average(r,t) as a function of time (t), the maximum temperature reached in the thickness of the tank Twall,max(t) as a function of time, the minimum temperature reached in the thickness of the tank Twall,min(t) as a function of time and to regulate the flowrate of the gas flow and/or of the temperature of said gas as a function of said calculated temperature of the tank, during bleed-off, when the calculated temperature of the tank is greater than the low threshold (LT), the gas flow is increased, the initial temperature T(0) of the gas in the tank, and the initial average temperature of the wall of the tank $T_w(0)$ are approximated as being equal to the ambient temperature measured or provided before filling, the geometric dimensions of the tank are known, for example communicated before filling in particular the internal length (Lint) of the tank, the internal diameter (Dint) of the tank, the diameter (di) of the injector in meters is also a parameter which is known before filling, the initial mass of gas m(0) in the tank (in kg) is calculated by an equation of state of the gas on the basis of the known values of initial pressure P(0) (in Pa) and of initial temperature T(0) of the gas (in K), in case of bleed-off the Nusselt number NuDint (dimensionless) of the gas in the tank (1) is given by the formula $NuDint=a \cdot RaDint^b$.

the determined and known thermo-physical properties of the tank comprise at least one from among: the density, the specific heat capacity, the thermal conductivity of the interior envelope of the tank (liner), the density, the specific heat capacity, the thermal conductivity of the composite, the volume of the tank, the internal and external lengths and diameters of the tank, the thickness of the liner and of the composite, the internal and external surface area of the tank, the total mass of the liner, the total mass of the composite, the diameter of injector in the tank, the headloss coefficient at the inlet of the bottle, the emissivity of the external surface of the tank, the average temperature Tgas,average(t) of the gas in the tank is the temperature averaged for the storage volume of the tank (in K), the tank is of cylindrical general shape, the average temperature of the wall of the tank Twall,average(r, t) as a function of a space variable (r) and of time (t), is the temperature in the thickness of the wall of the tank in a direction transverse to the wall, the space variable (r) being the position in the thickness of the wall in a direction parallel to a radius of the cylinder starting from the central longitudinal axis of the cylinder (in m), the maximum temperature reached in the thickness of the tank Twall,max(t) as a function of time is the maximum temperature (in K) reached by the wall at the time (t), whatever the portion of the wall, that is to say a maximum temperature in the spatial sense of the term, the initial temperature T(0) of the gas in the tank is measured by a temperature sensor, for example an ambient-temperature sensor, the initial pressure P(0) of the gas in the tank (in Pa) is measured by a pressure sensor at the inlet or in the tank, the initial average temperature of the wall of the tank $T_w(0)$ (in K) is measured by a temperature sensor or is approximated to the initial temperature of the gas in the tank T(0), the determination of the initial mass of gas in the tank m(0) is calculated via the ideal or real gas equation on the basis of the following known data: the initial pressure P(0) of the gas in the tank, the volume V of the tank, the initial temperature of the gas in the tank T(0) and of the compressibility factor Z of the real gas (dimensionless) or of the ideal gas constant R, the high temperature threshold (HT) lies between 65 and 105° C. and is preferably equal to 85° C., the gas flow is decreased during filling by reducing the rate of pressure increase in the tank, the low temperature threshold lies between −50° C. and −30° C. and is preferably equal to −40° C., the temperature and the pressure of the gas in the tank are considered to be homogeneous in the estimations or calculations, the filling rate is controlled by means of a valve or a pressure regulator of proportional integral type, the tank is a composite tank of type IV or III, the wall of the composite tank comprises a plastic or metal liner and a composite material layer, the average temperature of the gas Tgas,average(t) is determined in real time by numerical solution of two enthalpy balances: a first enthalpy balance applied to the gas injected into the tank and a second enthalpy balance applied to the wall of the tank; of the numerical solution of the heat equation in the wall; by using the equation of state for real gases, applied to the gas in the tank, the thermophysical properties of the gas such as the compressibility factor Z, the specific thermal capacity cp and the specific enthalpy of the gas being known, the average temperature (2D two-dimensional average) of the wall of the tank Tw(r,t) is determined in real time by numerical solution of two enthalpy balances: a first enthalpy balance applied to the gas injected into the tank and a second enthalpy balance applied to the wall of the tank; of the numerical solution of the heat equation in the wall; by using the equation of state for real gases, applied to the gas in the tank, the thermophysical properties of the gas such as the compressibility factor Z, the specific thermal capacity Cp and the specific enthalpy h of the gas being known, the Richardson number (dimensionless) is calculated as the ratio between the Grashoff number (dimensionless) and the Reynolds number (dimensionless) squared, the Reynolds number can be equal to the Reynolds number of the gas at the tank inlet (density on entry that multiplies the speed on entry that multiplies the diameter of the gas injector and divided by the dynamic viscosity at the inlet), the Reynolds number can be equal to the Reynolds number at the bottom of the bottle (density of the gas in the bottle that multiplies the speed of the gas at the bottom of the bottle that multiplies the diameter of the bottle and divided by the dynamic viscosity of the gas), the speed at the bottom of the bottle (vf) (in $m \cdot s^{-1}$) can be calculated on the basis of the speed of the gas at the bottle inlet (ve), of the diameter of the injector (di) (in meters), of the internal length of the bottle (Lint) (in meters) via the following formula: vf=(6.2 ve·di)/Lint the Grashof number Gr can be calculated by the formula: gas acceleration constant*isobar thermal expansion coefficient*(T (t)−Tw(r=rliner, t))*(Dint)$^3$/(kinematic viscosity of the gas)$^2$, the tank has a ratio (Lint/Dint) between the internal length of the tank Lint in meters and the internal diameter of the tank Dint in meters lying between 1 and 7 and preferably between 1.8 and 6.6, and preferably less than 4.5, the ratio (Dint/di) between the internal diameter of the tank Dint in meters and the diameter di of the injector in meters lies between 30 and 100 and is preferably between 35.0 and 72.3, the Reynolds number (Red) (dimensionless) relating to the forced convection in the tank lies between $5.6 \times 10^4$ and $2.0 \times 10^6$ the Rayleigh number (Radint) (dimensionless) relating to the internal natural convection in the tank (1) lies between $8.0 \times 10^8$ and $1.0 \times 10^{12}$ the mass mt(t) of gas in the tank is calculated in real time via the equation of state of the gas (real gas equation preferably) on the basis of the calculated average temperature value of the gas Tgas,average(t) in the tank (1) and of the pressure P(t) of the gas in the tank measured in real time.

The invention can also relate to a device for filling or bleeding off gas from a tank comprising a transfer pipe comprising a valve and connectable to a tank, the device comprising an electronic facility for data acquisition, storage and processing such as a computer or microprocessor, said facility piloting the transfer of gas between the source and the tank, the electronic logic being programmed to calculate at least one temperature of the tank from among: the average temperature of the wall of the tank Twall,average(r,t) according to its thickness (radius r) and as a function of time (t), the maximum temperature reached in the thickness of the tank Twall,max(t) as a function of time, the minimum temperature reached in the thickness of the tank Twall,min(t) as a function of time and to regulate the of the flowrate of the gas flow as a function of said calculated current temperature of the tank.

The invention can also relate to any alternative device or method comprising any combination of the characteristics hereinabove or hereinbelow.

BRIEF DESCRIPTION OF THE FIGURES

Other features and advantages will become apparent on reading the description hereinafter, given with reference to the figures in which.

DETAILED DESCRIPTION OF THE INVENTION

Figure 1:
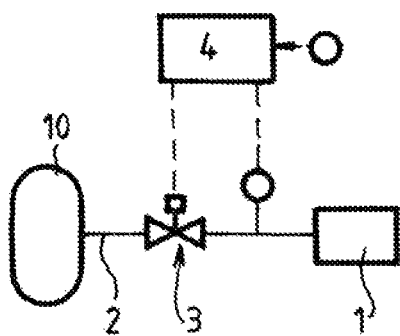
FIG. 1 represents a schematic and partial view illustrating an exemplary tank filling installation able to implement the invention.

FIG. 1 schematically illustrates a filling (or bleed-off) station for a pressurized gas tank 1, in particular for fuel such as gaseous hydrogen.

The tank 1, for example a composite tank of type IV, is delimited by a wall 1 of cylindrical general shape having determined and known dimensions and thermo-physical properties.

The station can comprise at least one high-pressure hydrogen source 10, at least one transfer pipe 2 selectively linking the source 1 to the tank 1 and an electronic facility 4 for data acquisition, storage and processing such as a computer or microprocessor.

Figure 3:
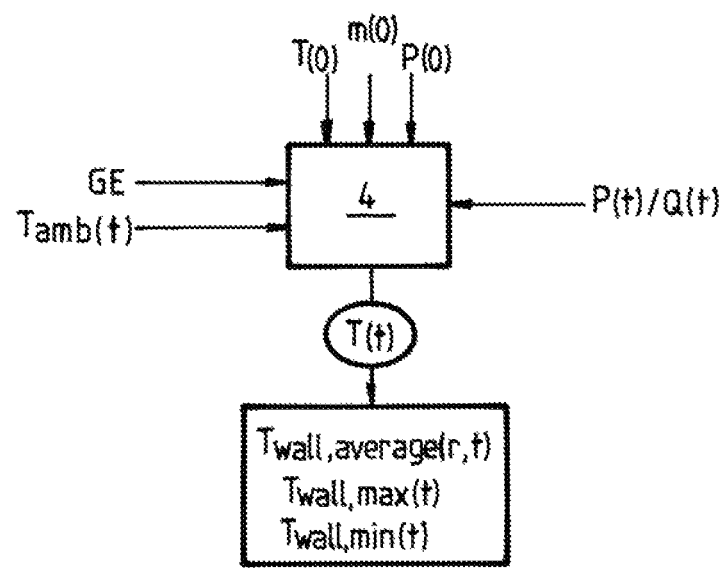

The electronic facility 4 pilots the transfer of gas between the source 10 and the tank 1 and can be programmed to calculate in real time at least one temperature of the tank (1) from among: the average temperature of the wall of the tank Twall,average(r,t) as a function of time (t), the maximum temperature reached in the thickness of the tank Twall,max(t) as a function of time, the minimum temperature reached in the thickness of the tank Twall,min(t) as a function of time and to regulate the flowrate of the gas flow and/or of the temperature of said gas as a function of said calculated temperature of the tank (cf. FIG. 3).

Of course, conventionally, in addition to the control of the extreme temperature (minimum and/or maximum) reached by the wall of the tank, the mass of gas in the tank is preferably controlled also (or any other parameter reflecting the quantity of gas in the tank). This mass of gas can be calculated conventionally on the basis of the calculated temperature of the gas and of the measured pressure of the gas.

The known input parameters for this or these calculations of estimations comprise for example:

the thermodynamic properties of the gas (of the tank in particular of its liner and of composite structure), the geometry GE of the tank (length, diameter, etc.). These data are known constants.

the known conditions of Pressure P(0), temperature T(0) and temperature of the wall Twall(0) at the initial instant t=0. These conditions can be measured or determined or approximated, the conditions in real time of Pressure of the incoming gas at the time t Pin(t), of temperature of the incoming gas Tin(t) at the time t, the pressure of the gas in the tank P(t) at the time t (measured for example in the pipe linked to the inlet/outlet of the tank 1), the ambient temperature Tamb(t) at the time t.

heat exchange and correlation coefficients a, b, c, d (explained hereinafter).

The coefficients a, b, c, d can be obtained by experimental trials for each type of tank on the basis of tests of pressure rise and fall in the tank. These coefficients can if appropriate be correlated with dimensions or ratios of dimensions of the tank.

On the basis of these known input data, the electronic facility 4 can be configured to calculate in real time the following output data:

the average temperature of the gas in the tank T(t)=Tgas, average(t) at the time t as a function of time t, the mass m(t) of gas in the tank at the time, the average temperature of the wall of the tank Twall, average(r,t) as a function of time t, r being the radius coordinate from the longitudinal axis of the tank, the maximum temperature reached by the wall of the tank Twall,max(t) as a function of time, the Richardson number Ri(t) for the gas in the tank at the time t (cf. hereinafter).

The average temperature of the wall of the tank Twall, average(r,t) represents the average in two dimensions (2D), that is to say that it represents the temperature of the wall layer at the coordinate r taken from the longitudinal axis of the tank. This temperature is homogeneous in two dimensions but can vary according to the radius r. This average temperature is calculated by solving for example the heat equation in the wall.

The maximum (respectively minimum) temperature reached by the wall of the tank Twall,max(t) as a function of time can be the temperature of the wall at the time t at the level of the interface between the gas and the wall.

An exemplary use of such a model for a filling station will be described hereinafter.

Let us assume a filling carried out at a constant inlet gas temperature. At each time interval the model (implemented by the electronic facility 4 which pilots the filling/bleed-off) estimates in real time the maximum temperature reached by the wall of the tank Twall,max(t) as a function of time.

If this maximum temperature becomes close to the allowable limit (85° C. for example), in this case the control facility 4 can reduce the pressure rise by acting for example on the control valve 3. This decrease in the pressure ramp (increase in pressure per unit time) reduces or eliminates the increase in the temperature. If the maximum temperature is below the allowable value, the rate of pressure increase can be increased.

This therefore entails a method of controlling the filling flowrate as a function of the estimated/calculated maximum temperature of the wall of the tank.

Figure 5:
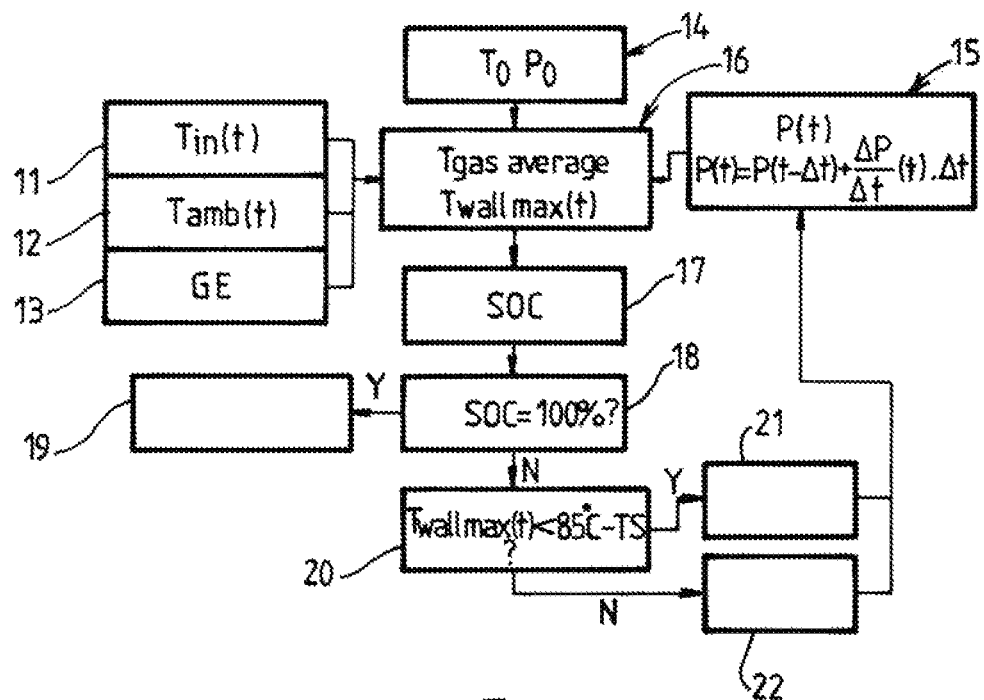

An exemplary application is illustrated schematically in FIG. 5. Thus, on the basis of the input parameters (steps 11, 12, 13, 14, 15) the average temperatures of the gas Tgas, average(t) as a function of time t and the maximum temperature reached by the wall of the tank Twall,max(t) as a function of time are calculated (step 16). On this basis, the state of charge SOC is calculated (step 17) and then this state of charge is compared with the target state of charge (100%). If the target state of charge is reached, filling is interrupted (step 19) otherwise it is continued and the maximum temperature of the tank Twall,max(t) is compared with the limit threshold 85° C. (less a safety factor TS) cf. step 20. If this temperature remains in the allowable limits (step 21) the filling rate can be maintained or increased and the process returns to the step of measuring the pressure of (step 15). If this temperature is not in the allowable limits (step 22) the filling rate can be reduced and the process returns to the step of measuring the pressure P(t) of (step 15).

Figure 6:
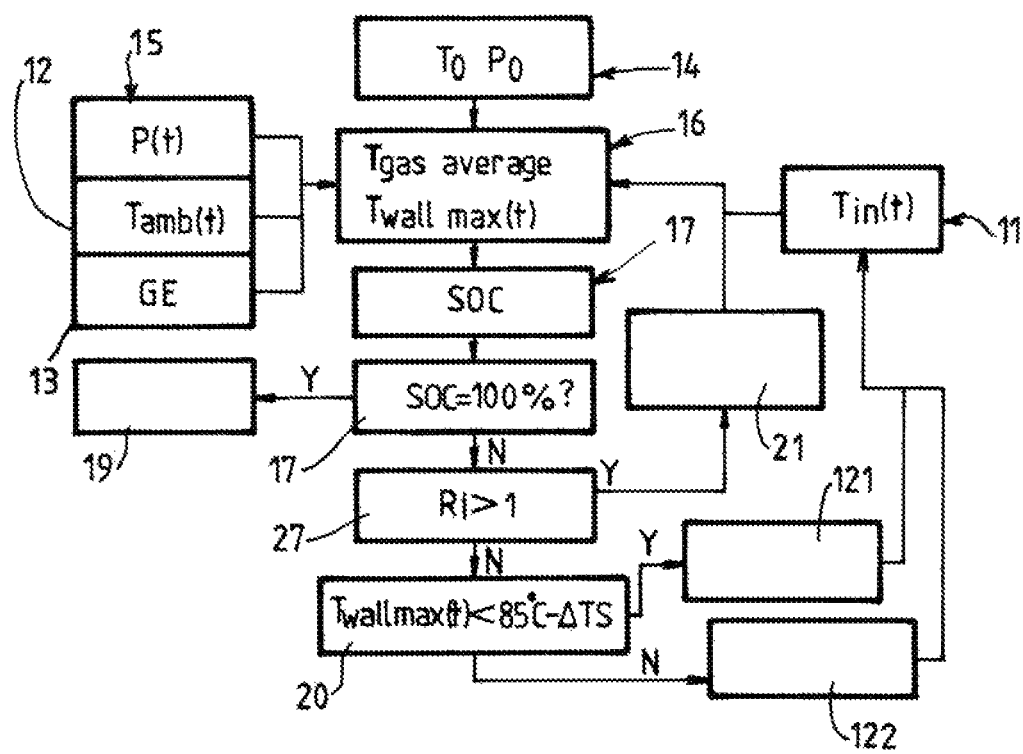

Alternatively to or cumulatively with the control of the flowrate, the temperature of the gas can be controlled (the gas is cooled or its cooling is increased if the maximum temperature approaches the allowable limit). Such an example is illustrated in FIG. 6. The process of FIG. 6 is distinguished from that of FIG. 5 solely in that, on completion of step 17 of calculating the state of charge SOC, the process comprises a step 27 during which the Richardson number Ri of the gas is compared with a reference value Vr (here Vr=1). If the Richardson number R1 exceeds the reference value ("Y," step 21) the filling rate can be maintained or increased and the process returns to step 16 of calculating the average temperature of the gas Tgas,average as a function of time t and the maximum temperature reached by the wall of the tank Twall,max(t) as a function of time. If the Richardson number Ri is less than the reference value ("N", step 21) the maximum temperature of the tank Twall,max(t) is compared with the limit threshold (less a safety factor TS) cf. step 20. Depending on whether this maximum temperature of the tank Twall,max(t) reaches the limit threshold (less a safety factor TS ("Y" step 122)), a new gas inlet temperature is calculated (that is to say that the temperature of the filling gas is lowered). The process returns to step 11 in which the model is supplied with the temperature of the gas Tin(t).

If on the other hand this maximum temperature of the tank Twall,max(t) remains below the limit threshold (less a safety factor TS ("Y" step 121)), a new gas inlet temperature is calculated (that is to say that the temperature of the filling gas is increased). The process returns to step 11 in which the model is supplied with the temperature of the incoming gas Tin(t).

Figure 2:
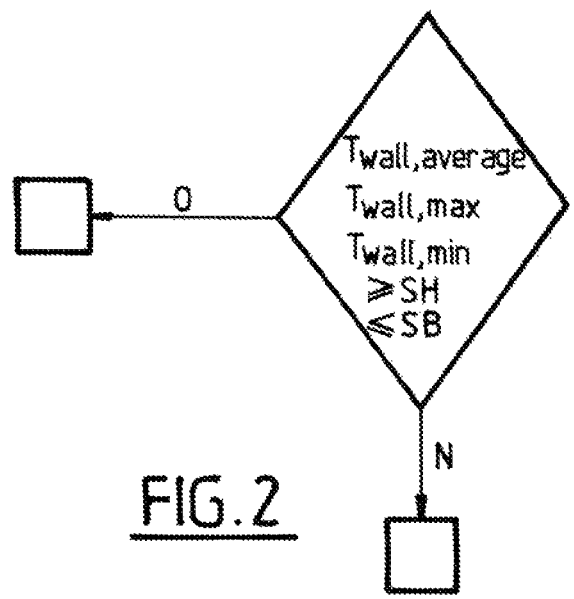
FIGS. 2 to 6 illustrate in a schematic and partial manner various logic diagrams illustrating examples of steps able to be implemented by the method according to the invention.

As illustrated schematically in FIG. 2, during filling, when the calculated temperature of the tank (1) reaches a determined high threshold (HT), the flow and in particular the flowrate of gas is decreased and/or the temperature of the gas supplied to the tank (1) is decreased by thermal exchange with a source of cold. Likewise, during bleed-off, when the calculated temperature of the tank reaches a determined low threshold (LT), the gas flow can be decreased.

Figure 4:
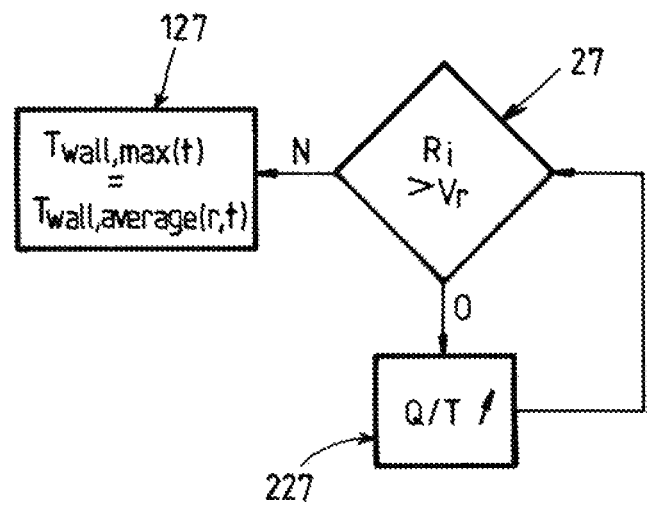

FIG. 4 illustrates in greater detail a possible taking into account of the Richardson number Ri.

The Richardson number Ri for the gas in the tank 1 as a function of time is calculated. The method comprises a step 27 of comparing the Richardson number number Ri calculated with a determined reference value Vr lying between 0.05 and 1.5 and preferably between 0.05 and 0.15 and in particular equal to 0.1. When Richardson Number number Ri calculated is less than determined reference value Vr (step 127), the temperature of the gas in the tank 1 is considered to be homogeneous that is to say that the maximum temperature reached by the wall of the tank Twall,max(t) as a function of time is considered to be equal to the average temperature of the wall of the tank Twall,average(r,t) in contact with the gas as a function of time (t): Twall,max(t)= Twall,average(r,t), r being the radius starting from the longitudinal axis of symmetry of the cylindrical tank. At the level of the interface in contact with the gas (that is to say r=radius at the level of what constitutes the "liner" of the tank), r=radius of the liner.

When the Richardson Number number Ri calculated is greater than determined reference value Vr, the temperature of the gas in the tank 1 is considered to be heterogeneous that is to say that the maximum temperature reached by the wall of the tank Twall,max(t) as a function of time is not equal to the average temperature of the wall of the tank Twall,average(r=radius of the liner,t) in contact with the gas as a function of time (t), and under these conditions, the method can comprise a step of increasing the flowrate supplied to the tank 1 so as to decrease the value of the Richardson Number (Ri) calculated below the determined reference value Vr (step 227 FIG. 4).

A nonlimiting exemplary model for calculating the average temperature of the gas in the tank Tgas,average(t) and the extreme temperature Twall,max(t) (maximum or minimum) of the wall of the tank will now be described.

Said model can be based on:
  a mass and energy balance for the gas in the tank 1,
  an equation of state of the gas,
  correlations with dimensionless coefficients modeling the heat exchanges between the gas and the wall of the tank, and between the wall of the tank and the exterior environment
  a one-dimensional heat equation in the wall of the tank,
  a correlation between the maximum temperature of the wall of the tank as a function of time and the average temperature of the gas and of the wall in contact with the gas as a function of time. This correlation can be obtained by trials and/or simulations.

It will be possible to refer for example to document WO2013014346A1 (or the article "Evaluating the temperature inside a tank during a filling with highly-pressurized gas", published in 2014, authors: Thomas Bourgeois and al. Seoul (Korea): Proceedings of the 20th World Hydrogen Energy Conference, 2014.

Calculational details of said model will be described hereinbelow. For the sake of simplification, the tank is considered to be filled with gas. However, the adaptation of the model to the case of a bleed-off or of a stabilization (neither filling nor bleed-off) will be described afterwards.

The model combines the mass and energy balances of the gas and of the equation of state of the gas.

For a filling, the temperature and the pressure of the gas in the tank are considered to be homogeneous. The gas entering the tank 1 possesses an enthalpy $h_{in}$ and the gas in the tank is considered to exchange heat with the wall via a thermal exchange coefficient $k_g$. The mass of gas in the tank is considered to vary directly according to the incoming gas flowrate.

In this case, $$\frac{dm}{dt} = \dot{m}_{in}$$

Hereinafter, the mass variation as a function of time will be called $$\frac{dm}{dt} = \dot{m}_{in} = \dot{m}.$$

The first energy equation of the model and the enthalpy balance are applied to the open system of the interior of the tank 1. The kinetic energy and the variations of gravitational energy are neglected. Knowing the volume V of the tank, the internal surface area $S_{int}$ of the tank and the specific enthalpy of the gas, we have the expression:

$$m\frac{dh}{dt} = V\frac{dP}{dt} + k_g S_{int}(T_{wi} - T) + \dot{m}(h_{in} - h) \quad \text{(expression 1)}$$

With these assumptions, the enthalpy variations are due to three factors: the compression of the gas, the incoming enthalpy, and the heat exchanges with the wall. The second energy equation is the definition of the enthalpy variation of a real gas:

$$dh = c_p dT + (1 - \beta T)\frac{dP}{\rho} \quad \text{(expression 2)}$$

By combining expressions 1 and 2 we obtain an equation describing the evolution of the temperature of the gas in the tank as a function of the pressure increase, of the temperature of the wall, of the gas flowrate and of the enthalpy of the incoming gas.

$$mc_p \frac{dT}{dt} = V\beta T \frac{dP}{dt} + k_g S_i(T_{wi} - T) + \dot{m}(h_e - h) \quad \text{(expression 3)}$$

To complete the model, the following equation of state of a real gas can be used:

$$PV = nRZ(T,P)T \quad \text{(expression 4)}$$

To estimate the evolution of the temperature of the gas the system of equations can be discretized by considering that certain derivatives can be calculated as variations and that certain variables at the instant t are close to the values at the previous instant (t−1).

Thermodynamic parameters Cp, β, h and Z can be estimated for each pressure and temperature by using the tables of the NIST standard.

At this juncture two discretizations can be undertaken according to the choice of the input parameters: mass flowrate Q(t), or pressure of the gas P(t). The term "input parameter" designates a variable is known either by its measurement (example the pressure measured in the filling/bleed-off duct) or known because it is provided in the model (for example a pressure increase of 0.2 bar per second).

The following paragraphs relate to the discretization of the equations in the case of the mass flowrate or pressure input datum.

Combining and discretizing expressions 3 and 4 we obtain:

$$T_t = T_{t-1} \frac{1 - \frac{m_{t-1}}{m_t} A_{t-1}}{1 - A_{t-1}} +$$

$$\frac{\Delta t k_{g_{t-1}} S_{int}(T_{wi_{t-1}} - T_{t-1}) + (m_t - m_{t-1})(h_{int_{t-1}} - h_{t-1})}{m_t c_{P_{t-1}}(1 - A_{t-1})}$$

with, $m_t = m_{t-1} + Q_t \Delta t$ with, $A_{t-1} = \frac{\beta_{t-1} T_{t-1} R Z(T_{t-1}, P_{t-1})}{c_{P_{t-1}} M}$ On the basis of these equations, knowing the state at the previous time (t−1), in addition to the flowrate signal Q(t) at the time t, it is possible to determine the temperature of the gas at the time t.

On the basis of the equation of state of the gas, knowing the pressure P at the time (t−1) the temperature of the gas T at the time t and the mass m(t) at the time t, the pressure P(t) at the time t can be calculated.

With the following notation:

$$A = \frac{V \beta_{t-1} T_{t-1}(P_t - P_{t-1})}{\Delta t} + k_{g_{t-1}} S_{int}(T_{wi_{t-1}} - T_{t-1}) - \frac{m_{t-1}}{\Delta t}(h_{int_{t-1}} - h_{t-1})$$

and $$B = \frac{P_t V M}{R Z(T_{t-1}, P_t) \Delta t}$$

It is possible to discretize the previous equations to obtain the expression for the temperature T at the instant t.

$$T_t = \frac{c_{P_{t-1}} T_{t-1} + h_{int_{t-1}} - h_{t-1}}{c_{P_{t-1}} - \frac{A}{B}}$$

Here again, knowing the system at the previous time (t−1) and the pressure value at the time t it is possible to calculate the temperature of the gas at the time t.

On the basis of the state equation, by knowing Tgas, average(t) and P(t) it is possible to calculate the mass of gas in the tank at the time t.

In the case of a bleed-off, the temperature of the gas in the tank can be calculated. The only difference with the previous equations resides in the fact that the enthalpy at the inlet is now the enthalpy at the outlet and is considered to be equal to that of the gas in the tank. Thus the term ($h_{in}$−h) of the expression is zero. The input datum in this case can be either the pressure in the tank or the outgoing mass flowrate.

The modeling of the heat exchanges is a significant parameter of the model. Unlike complex modelings via the Navier Stokes equations, the thermal exchanges between the gas and the wall can be modeled via correlations based on dimensionless numbers.

In the case of tank filling at high pressure 200 bar, 700 bar or 1000 bar, a correlation is advocated based on the Nusselt, Rayleigh and Prandtl numbers ($Nu_{Dint}$, $Ra_{Dint}$ and $Re_{d_{in}}$) for example according to the scheme described in document EP2824378A1.

The expression is for example:

$$Nu_{Dint} = a Ra_{Dint}^b + c Re_{d_{in}}^d$$

The Nusselt number ($Nu_{Dint}$) is based on the internal diameter of the tank and represents the convective heat exchanges between the gas and the wall. The correlation is based on two terms. A first term represents the natural convection (based on the Rayleigh number) while the second term represents the exchanges by forced convection and depends on the Reynolds number.

The correlation coefficients a, b, c and d are assumed to be constant and depend solely on the geometry of the tank and the nature of the gas flow within it.

This model can determine this expression (and therefore the coefficients) by trials. They are therefore assumed to be known and fixed for various filling conditions.

In the case of a bleed-off the expression may be $$Nu_{Dint} = a Ra_{Dint}^b$$

that is to say that the heat exchanges are due solely to natural convection based on the Rayleigh number.

This type of correlation is well known in the literature.

When wind blows around the tank, the external exchanges of heat between the tank and its environment can be modeled with an equation of forced convection between the air and a cylinder according to a formula of the typo:

$$Nu_a = \frac{k_a D_{ext}}{\lambda_{air}} = \left(\left(0.4 Re_{D_{ext}}^{0.5} + 0.06 Re_{D_{ext}}^{\frac{2}{3}}\right) Pr_{air}^{0.4}\right)$$

If the wind is zero the Reynolds number can be considered to be zero. It is possible to choose a free convection correlation.

The modeling of the gas and of the heat exchanges between the gas and the wall have thus been explained, the principle of the model calculating the evolution of the temperature of the wall will now be described.

To solve the heat equation in the wall, the wall will be modeled as one-dimensional.

A heat balance is carried out in an elementary volume element dV lying between the portions of radius r and r+dr (with respect the longitudinal axis of the tank).

This elementary volume is an enclosed cylinder assumed to be homogeneous in temperature (T(r,t)). This elementary volume has a homogeneous thickness dr and an internal diameter r. Its internal length is $L_{int}+2(r-r_{int})$ with $L_{int}$ and $r_{int}$ being respectively the internal length and the radius of an equivalent zero-dimensional cylinder ("0D").

The heat exchanges with the elementary volume and through a heat flow $\vec{j}$ can be expressed according to Fourier's law $\vec{j} = -\lambda \overrightarrow{grad} T(r, t)$.

The heat balance in the elementary volume can be expressed as follows:

$$\rho c_p dV \frac{\partial T}{\partial t} = -\lambda_r \frac{\partial T}{\partial r}\bigg|_r S_r + \lambda_{r+dr} \frac{\partial T}{\partial r}\bigg|_{r+dr} S_{r+dr}$$

At the interface between the gas and the internal wall (liner) we consider continuity of the power at the time t+Δt Consequently:

$$P = k_g(t + \Delta t) A_{int}(T_{gas}(t + \Delta t) - T(r_{liner}, t + \Delta t)) = \int_{A_{int}} -\lambda(r_{liner}, t + \Delta t)$$

-continued $$= \int_{A_{int}} -\lambda(r_{liner}, t+\Delta t) \frac{\overline{gradT \cdot \vec{n} dA}}{\frac{\partial T}{\partial r} dA}$$

At the level of the interface between the composite and the liner we consider equality of the flows (index "w" for the flow in one direction, for example west, and index "e" for the opposite direction).

$$-\lambda(r_w, t+\Delta t)\left(\frac{\partial T}{\partial r}\right)_w = -\lambda(r_e, t+\Delta t)\left(\frac{\partial T}{\partial r}\right)_e$$

We consider a single temperature point for this interface between the composite and the liner, expressed by $T(r_{LC},t)$.

At the level of the interface with the environment we have the expression:

$$-\lambda(r_w, t+\Delta t)\left(\frac{\partial T}{\partial r}\right)_w = $$
$$k_a(t+\Delta t)(T(D_{ext}, t+\Delta t) - T_{amb}) + \epsilon\sigma(T(D_{ext}, t+\Delta t)^4 - T_{amb}^4)$$

The left-hand term represents the flow into the tank while the right-hand term is the flow out of the tank, on the surface of the tank.

The discretization of the one-dimensional wall equations has been described previously with the zero-dimensional discretization of the mass of gas and the energy balance. Moreover the previously described correlation of the heat flows with the wall makes it possible to determine (calculate) the values of average temperature of the gas as a function of time Tgas,average(t) and of average temperature of the wall of the tank Twall,average(r,t).

On this basis, the device must determine the maximum temperature of the wall Twall,max(t).

Accordingly the method uses a correlation between the average temperature of the wall of the tank Twall,average (r,t) and the maximum temperature of the wall Twall,max(t).

The temperature heterogeneities in the tank and the wall are considered to depend essentially on the gas flowrates and speeds. A possible correlation has the following form:

$$T_{wall,max}(t) = f\left(T_{wall,avearge}(r_{liner}, t), T_{gas,average}(t), \frac{L}{D}, \frac{D}{d}, \dot{m}\right)$$

To determine this correlation (function f) experiments (fillings, bleed-offs) can be carried out by measuring the gas temperatures and the temperatures obtained at the level of the wall. Simulations in two or three dimensions can make it possible to calculate the hot/cold points during filling/bleed-off.

On the basis of experimental measurements it has been observed that the Richardson number is very useful for determining the homogeneity or heterogeneity conditions of the temperature in the tank.

The Richardson number is given by $$Ri = \frac{Gr}{Re^2}$$

$$\text{With } Gr = \frac{g\beta_g|T_g - T_{wi}|D_{int}^3}{v_g^2}$$

The Reynolds number can be written in the following manner $$Re_{d_{in}} = \frac{\rho_{in}V_{in}d_{in}}{\mu_g}$$

$$\text{With } v_{in} = \frac{4\dot{m}}{\Pi \mu d_{in}}$$

$$\text{or else } Re_{D_{int}} = \frac{\rho_g V_{bottom} D_{int}}{\mu_g}$$

With $$V_{bottom} = 6.2 \frac{d_{in}}{L_{int}} v_{in}$$

This expression is dependent on the time t and can be calculated at each step by the model. The calculated Richardson number can be compared with a reference value Vr.

This makes it possible to indicate the homogeneity level during the filling/bleed-off process.

For tanks of cylindrical general shape with a ratio L/D (Length L over diameter D) of less than 4.5 (L/D<4.5), the reference value may be of the order of 1.

Ri<1 indicates homogeneity conditions and Ri>1 indicates non-homogeneous conditions.

During gas transfer the transfer conditions can be adapted to maintain the homogeneity conditions. Under these homogeneity conditions, the maximum temperature reached by the wall of the tank Twall,max(t) is the average temperature of the wall in contact with the gas. No correlation is necessary in this case between the average temperature of wall in contact with the gas and maximum wall temperature.

For tanks in which the ratio L/D>4.5 the heterogeneity conditions can be considered to still be present. A correlation is necessary in this case.

This method (calculation) can be applied during the transfer of gas in a filling/bleed-off station. Of course, these calculations may be carried out a priori for each type of tank so as to pre-establish the optimal gas transfer conditions.

Simulations may in particular be undertaken to determine different filling speeds and the temperature profiles obtained. In this manner, it is possible to determine the optimal filling conditions beforehand (speed, flowrate, cooling).

The invention applies equally well to filling in order to control the heating of the tank and to bleed-off in order to control the cooling of the tank.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

NOMENCLATURE AND UNITS OF THE TERMS USED

A surface area ($m^2$)
a Thermal conductivity ($m^2 \cdot s^{-1}$)
$c_p$ Specific heat of the gas at constant pressure ($J \cdot kg^{-1} \cdot K^{-1}$)
$c_v$ Specific heat of the gas at constant volume ($J \cdot kg^{-1} \cdot K^{-1}$)
d Diameter of the injector of gas into the tank (m)
D Diameter of the tank (m)
e Thickness (m)
g Acceleration due to gravity ($m \cdot s^{-2}$)
h Specific enthalpy ($J \cdot kg^{-1}$)
k Heat exchange coefficient ($W \cdot m^{-2} \cdot K^{-1}$)
L Length of the tank (m)
m Mass in the tank (kg)
$\dot{m}$ Mass flowrate into the tank (also "Q") ($kg \cdot s^{-1}$)
M Molar mass of the gas used ($kg \cdot mol^{-1}$)
P Pressure of the gas (Pa)
$P_0$ Atmospheric pressure (Pa)
q Heat flow ($J \cdot s^{-1} \cdot m^{-2}$)
r Radius, coordinate in the wall of the tank starting from the longitudinal axis (m)
R Ideal gas constant ($J \cdot mol^{-1} \cdot K^{-1}$)
S Surface area of the tank ($m^2$)
t Time (s)
T Temperature (K)
$T_{fe}$ Temperature of the air in contact with the exterior wall of the tank (K)
$T_{fi}$ Temperature of the gas in contact with the internal wall of the tank (K)
$T_{we}$ Temperature of the wall in contact with the air (K)
$T_{wi}$ Temperature of the wall in contact with the gas (K)
V Volume of the tank ($m^3$)
$V_m$ Molar volume ($m^3 \cdot mol^{-1}$)
ν Specific volume ($m^3 \cdot kg^{-1}$)
Z Compressibility factor of the gas used in the real gas equation (dimensionless)
β Thermal expansion coefficient ($K^{-1}$)
γ Ratio of specific heats $c_p/c_v$
ε Emissivity of the external surface of the tank (dimensionless)
λ Thermal conductivity ($W \cdot m^{-1} \cdot K^{-1}$)
μ Dynamic viscosity (Pa·s)
$\mu_{JT}$ Joule-Thomson coefficient of the gas ($K \cdot Pa^{-1}$)
ρ Density ($kg \cdot m^{-3}$)
ω Speed of the gas ($m \cdot s^{-1}$)
Meaning of the Indices
air Air
amb Ambient
comp Property relating to the composite
ext External wall
f Final
g Gas
in Property or nature at the level of the inlet of the tank
int Internal
liner Property of the internal envelope (liner) of the tank
0 Initial
w Property of the wall
  Dimensionless Parameter
$Nu_g$ Nusselt Number of the gas, $$Nu_g = \frac{k_g D_{int}}{\lambda}$$

$Nu_{air}$ Nusselt Number of the air, $$Nu_{air} = \frac{k_a D_{ext}}{\lambda_{air}}$$

$Ra_{Dint}$ Rayleigh Number of the gas
$Ra_{Dext}$ Rayleigh Number of the ambient
$Re_{d_{in}}$ Reynolds Number of the flow
$Re_{D_{ext}}$ Reynolds Number of the air
$Pr_{air}$ Prandtl Number of the air, $$Pr_{air} = \frac{\mu_{air} c_{p_{air}}}{\lambda_{air}}$$

What is claimed is:

1. A method for filling with, or bleeding off, a pressurized gas tank containing a gas, the tank being delimited by a wall of cylindrical general shape having a longitudinal axis and determined and known dimensions and thermo-physical properties and comprising a liner, comprising a gas, wherein a control valve is connected to the tank,
   the method comprising;
      calculating, in real time at least one temperature of the tank selected from the group consisting of:
         an average temperature of the wall of the tank Twall,average(r,t) as a function of time (t) and r being a radius coordinate starting from a longitudinal axis of the tank,
         a maximum temperature reached by the wall of the tank Twall,max(t) as a function of time, and
         a minimum temperature reached by the wall of the tank Twall, min(t) as a function of time; and using the control valve to regulate an inlet flow rate of the gas into the tank, a bleed off flow rate of the gas out of the tank, and/or an temperature of the gas used to fill the tank, thereby preventing the pressurized tank from reaching a determined high temperature threshold or a determined low temperature threshold, wherein the regulation of the inlet flow rate, the bleed off flow rate and/or the temperature of the gas used to fill the tank is carried out as a function of said at least one calculated temperature of the tank.

2. The method of claim 1, wherein, during filling, when the calculated temperature of the tank reaches a determined high threshold (HT), the inlet flow rate is decreased and/or the inlet temperature is decreased by thermal exchange with a source of cold.

3. The method of claim 1, wherein, during filling, when the calculated temperature of the tank is less than a high threshold (HT) by a determined value, the inlet flow rate is increased and/or the inlet temperature and/or of the temperature of the tank is increased by thermal exchange with a source of heat.

4. The method of claim 1, further comprising;
calculating a Richardson Number (Ri) for the gas in the tank as a function of time,
comparing the Richardson Number (Ri) calculated with a determined reference value (Vr) lying between 0.05 and 1.5 and, when the Richardson Number (Ri) calculated is less than determined reference value (Vr) the temperature of the gas in the tank is considered to be homogeneous, wherein the maximum temperature reached by the wall of the tank Twall, max(t) as a function of time is equal to the average temperature of the wall of the tank Twall,average(r,t) in contact with the gas as a function of time (t): Twall,max(t)=Twall,average(r=r_liner,t).

5. The method of claim 4, wherein, during filling, when the Richardson Number (Ri) is greater than the reference value (Vr), the inlet flow rate is increased.

6. The method of claim 4, further comprising regulating the inlet flow rate, wherein when the Richardson Number number (Ri) calculated is greater than determined reference value (Vr), the temperature of the gas in the tank is considered to be heterogeneous wherein the maximum temperature reached by the wall of the tank Twall,max(t) as a function of time is not equal to the average temperature of the wall of the tank in contact with the gas as a function of time (t) wherein at the liner, Twall,average(r=radius of the liner of the tank, t), the method comprises a step of increasing the inlet flow rate thereby decreasing the value of the Richardson Number (Ri) calculated below the determined reference value (Vr) and thus render the gas homogeneous in temperature.

7. The method of claim 4, further comprising, before filling, a step of determining or detecting, by sensor(s), an initial temperature T(0) of the gas in the tank, an initial pressure P(0) of the gas in the tank, an initial average temperature of the wall of the tank Tw, average(0) and a step of determining an initial mass of gas in the tank m(0) and then, during filling
when the Richardson Number (Ri) calculated is less than determined reference value (Vr) the temperature of the gas in the tank (1) is considered to be homogeneous, and under these conditions, the method comprises, in the course of filling, a step of calculating an average temperature Tgas,average(t) of the gas in the tank in real time as a function of time and the average temperature of the wall Twall,average(r,t) in real time as a function of time (t) on the basis of a mass and enthalpy balance applied to the gas in the tank and on the basis also of an energy balance in the wall of the tank, of the equation of state of the gas, and of a balance of the thermal exchanges between the gas and the wall, and between the wall of the tank is the exterior, and/or
when the Richardson Number (Ri) calculated is greater than determined reference value (Vr) the temperature of the gas in the tank is considered to be heterogeneous, and under these conditions, the method comprises, in the course of filling, a step of calculating the average temperature Tgas,average(t) of the gas in the tank in real time as a function of time (t) and the average temperature of the wall Twall,average(r,t) in real time as a function of time on the basis of a mass and enthalpy balance applied to the gas in the tank and of an energy balance in the wall of the tank, of the equation of state of the gas, and of a balance of the thermal exchanges between the wall of the tank is the exterior,
method comprising a step of calculating the maximum temperature reached by the wall of the tank Twall,max(t) as a function of time, this maximum temperature reached by the wall of the tank Twall,max(t) as a function of time being obtained by correlation on the basis of the average temperature Tgas,average(t) of the gas in the tank calculated in real time as a function of time and as a function of the average temperature of the wall Twall,average(r,t) in real time as a function of time (t).

8. The method of claim 7, further comprising
calculating the enthalpy hin(t) of the gas entering or exiting the tank as a function of time,
measuring or calculating the mass of gas m(t) introduced or bled off from the tank as a function of time or, respectively,
determining the pressure P(t) in the tank as a function of time,
determining the average temperature of the gas Tgas, average(t) at the instant t in the tank in degrees K, this average temperature Tgas,average(t) being expressed as a first-degree function of the average temperature of the gas T(t−1) at the previous instant (t−1) and of a coefficient of convective heat exchange between the gas and the internal wall of the tank at the instant (t−1) in W·m−2·K−1, in which the heat exchange coefficient kg(t−1) is given by the relation kg=(λg/Dint)·Nuint in which λg is the thermal conductivity of the gas in the tank in W·m−1·K−1, Dint is the internal diameter of the tank in meters and NuDint the Nusselt number of the gas in the tank (dimensionless), and in which the Nusselt number of the gas is expressed as a function of the Reynolds number (Redin) (dimensionless) relating to the forced convection in the tank and of the Rayleigh number (RaDint) (dimensionless) relating to the internal natural convection in the tank according to a formula NuDint=a·RaDintb+c·Redind in which a and c are dimensionless coefficients dependent on the ratio (Lint/Dint) between the internal length of the tank Lint in meters and the internal diameter of the tank Dint in meters and on the ratio (Dint/di) between the internal diameter of the tank Dint in meters and the diameter of the injector di in meters, a, b, c and d being dimensionless positive real numbers, a lying between 0 and 1, b lying between 0.2 and 0.5, c lying between 0 and 1 and d lying between 0.5 and 0.9.

9. The method of claim 7, further comprising estimating the maximum temperature reached in the thickness of the tank Twall,max(t) as a function of time, or respectively the minimum temperature reached in the thickness of the tank Twall,min(t) as a function of time, on the basis of the average temperature Tgas,average(t) of the gas in the tank calculated in real time as a function of time (t), said maximum or minimum temperature being obtained on the basis of a correspondence chart(s) obtained by experiment, and/or on the basis of calculation and/or of simulations so that to an average temperature Tgas,average(t) of the gas in the tank calculated in real time as a function of time (t) there corresponds, according to the known conditions of gas flowrate, of the diameter of an injector of gas into the tank and of the dimensions and characteristics of the tank, a maximum or, respectively minimum, temperature in the thickness of the tank as a function of time.

10. The method of claim 4, wherein the Richardson Number (Ri) for the gas in the tank as a function of time is calculated on the basis of the Grashoff number (Gr) for the gas and of the Reynolds number (Re) for the gas at the time (t) according to the following formula: Ri=Gr/Re2, in which the Grashof (Gr) and Reynolds (Re) numbers are data which are known or calculated on the basis of the measured value of pressure of the gas or of the mass of gas in the tank and of the average gas temperature Tgas,average(t) of the gas in the tank.

11. The method of claim 1, wherein, during bleed-off, when the calculated temperature of the tank reaches a determined low threshold (LT), the outlet flow is decreased.

12. The method of claim 1, further comprising a step of continuous measurement or calculation of a property selected from the group consisting of: the pressure Pin(t) at the time (t) of the gas introduced into or bled off from the tank, the temperature Tin(t) at the time (t) of the gas introduced into or bled off from the tank, the pressure P(t) in the tank at the time (t), the ambient temperature Tamb(t) at the time (t), and the mass of gas m(t) in the tank at the time (t).

13. The method of claim 1, further comprising implementing by a station for filling hydrogen gas tanks comprising at least one high-pressure hydrogen source, at least one gas transfer pipe selectively linking the source to a tank, and an electronic facility for data acquisition, storage and processing such as a computer or microprocessor, said facility piloting the transfer of gas between the source and the tank, wherein the electronic logic is programmed to calculate in real time at least one temperature of the tank from among: the average temperature of the wall of the tank Twall, average(r,t) as a function of time (t), the maximum temperature reached in the thickness of the tank Twall,max(t) as a function of time, the minimum temperature reached in the thickness of the tank Twall,min(t) as a function of time and to regulate the flowrate of the gas flow and/or of the temperature of said gas as a function of said calculated temperature of the tank.

14. A device for filling with, or bleeding off, gas from a tank comprising an electronic facility for data acquisition, storage and processing and a transfer pipe that comprises a control valve that is connectable to the tank being filled with gas or from which gas is being bled off, the electronic facility for data acquisition, storage and processing comprising a computer or microprocessor, said facility piloting a transfer of gas between the source and the tank, wherein:
  the electronic facility for data acquisition, storage and processing is programmed with logic to calculate at least one temperature of the tank selected from the group consisting of:
    an average temperature of a wall of the tank Twall, average(r,t) according to its thickness (radius r) and as a function of time (t),
    a maximum temperature reached in a thickness of the tank Twall,max(t) as a function of time, and
    a minimum temperature reached in the thickness of the tank Twall,min(t) as a function of time;
  the electronic facility for data acquisition, storage and processing is further programmed with logic to act upon the control valve to regulate an inlet flow rate of the gas into the tank, a bleed off flow rate of the gas out of the tank, and/or an temperature of the gas used to fill the tank, thereby preventing the pressurized tank from reaching a determined high temperature threshold or a determined low temperature threshold; and
  the regulation of the inlet flow rate of the gas into the tank, the bleed off flow rate of the gas out of the tank, and/or the temperature of the gas used to fill the tank is carried out as a function of said at least one calculated temperature of the tank.

* * * * *